United States Patent [19]

Ebine et al.

[11] Patent Number: 5,169,661

[45] Date of Patent: Dec. 8, 1992

[54] PROCESS FOR MAINTAINING THE FRESHNESS OF RAW SEA URCHIN GONADS

[75] Inventors: Yutaka Ebine; Akimasa Nishida, both of Tokyo, Japan

[73] Assignee: Daiichi Pharmaceutical Co., Ltd., Tokyo, Japan

[21] Appl. No.: 651,411

[22] PCT Filed: Jul. 13, 1990

[86] PCT No.: PCT/JP90/00913

§ 371 Date: Feb. 12, 1991

§ 102(e) Date: Feb. 12, 1991

[87] PCT Pub. No.: WO92/00675

PCT Pub. Date: Jan. 23, 1992

[51] Int. Cl.$^5$ ............................................. A23B 4/14
[52] U.S. Cl. ................................... 426/332; 426/643
[58] Field of Search ................................ 426/643, 331

[56] References Cited

U.S. PATENT DOCUMENTS 3,947,601 3/1976 Ortega ................................. 426/643

FOREIGN PATENT DOCUMENTS

| 63-2583 | 1/1980 | Japan | 426/643 |
|---|---|---|---|
| 55-9735 | 1/1980 | Japan | 426/643 |
| 55-29958 | 3/1980 | Japan | 426/643 |
| 55-68259 | 5/1980 | Japan | 426/643 |
| 55-88679 | 7/1980 | Japan | 426/643 |
| 56-48878 | 5/1981 | Japan | 426/643 |
| 57-159469 | 10/1982 | Japan | 426/643 |
| 58-138346 | 8/1983 | Japan | 426/643 |
| 5917939 | 1/1984 | Japan . | |
| 60-37956 | 2/1985 | Japan | 426/643 |
| 60-192572 | 10/1985 | Japan | 426/643 |
| 61-21070 | 1/1986 | Japan | 426/643 |
| 61-92551 | 5/1986 | Japan | 426/643 |
| 62-278940 | 12/1987 | Japan . | |
| 637770 | 1/1988 | Japan . | |
| 63-130139 | 6/1988 | Japan . | |
| 63-237760 | 10/1988 | Japan . | |
| 63-254966 | 10/1988 | Japan | 426/643 |
| 1-95750 | 4/1989 | Japan | 426/643 |
| 1-281061 | 11/1989 | Japan | 426/643 |
| 1-291769 | 11/1989 | Japan | 426/643 |
| 1-300877 | 12/1989 | Japan | 426/643 |
| 2-46258 | 2/1990 | Japan | 426/643 |

*Primary Examiner*—Carolyn Paden
*Attorney, Agent, or Firm*—Sughrue, Mion, Zinn, Macpeak & Seas

[57] ABSTRACT

The present invention relates to a process for maintaining the freshness of raw sea urchin gonads taken out of tests and a process for producing raw sea urchin gonads maintaining the freshness.

Known processes for maintaining the freshness of raw sea urchin gonads comprise using an additive such as common salt or alum or storing raw sea urchin gonads in a partial-freezing state. However each of these known processes has some disadvantages in the maintenance of the freshness of raw sea urchin gonads, for example, deterioration in the flavor of raw sea urchin gonads or meat-breakdown.

The present invention has solved the above-mentioned problems by providing a process for maintaining the freshness of raw sea urchin gonads which comprises immersing raw sea urchin gonads taken out of tests in an aqueous solution containing a branched dextrin and optionally further immersing the raw sea urchin gonads in another aqueous solution containing an edible calcium salt.

4 Claims, No Drawings

PROCESS FOR MAINTAINING THE FRESHNESS OF RAW SEA URCHIN GONADS

TECHNICAL FIELD

This invention relates to a process for maintaining the freshness of raw sea urchin gonads and a process for the production of raw sea urchin gonads maintaining the freshness.

BACKGROUND ART

Raw sea urchin gonads immediately after taking out from tests, that is, edible meats of sea urchin have a delicate taste, wherein the smell of the sea is mixed with the characteristic sweetness, and thus are widely favored. When allowed to stand, however, the sea urchin gonads suffer from melting followed by meat-breakdown within a half day. Attempts have been made to prevent the meat-breakdown, namely, to establish an effective method for the preservation of raw sea urchin gonads. Known chemical processes comprise treating raw sea urchin gonads with common salt at a concentration closely similar to seawater or adding alum to raw sea urchin gonads while controlling the concentration of common salt so as to constringe the raw sea urchin gonads. On the other hand, known physical processes involve a partial-freezing method wherein raw sea urchin gonads are maintained in a partially freezing state. Furthermore, it has been attempted to combine these chemical processes with the physical ones.

The consumption of raw sea urchin gonads in Japan has been more and more increasing. Recently, a large amount of raw sea urchin gonads produced in foreign countries are imported to Japan so as to satisfy the demand. Thus the output of imported raw sea urchin gonads overwhelmingly exceeds that of domestic ones at present in Japan. Since imported raw sea urchin gonads are processed at the production place before transporting, it is an important problem how to maintain a freshness of raw sea urchin gonads for a long time. From the viewpoint of taste, the inherent flavor and sweetness of raw sea urchin gonads would be deteriorated with the lapse of time. With the recent tendency toward gourmandism, consumers favoring the inherent taste of raw sea urchin gonads are increasing. Thus it is important to establish an improved process whereby not only the shape of raw sea urchin gonads but also the inherent taste thereof can be maintained.

Each of the known preservation processes as described above has some disadvantages and thus is unsatisfactory. In the case of the chemical processes, the treatment with common salt alone can maintain the shape of raw sea urchin gonads immediately after the treatment for a day at the longest. The subsequent meat-breakdown would significantly deteriorate the commercial value of the raw sea urchin gonads. When common salt is used together with alum, the shape of the raw sea urchin gonads immediately after the treatment can be maintained for only 2 or 3 days. The subsequent meat-breakdown would significantly deteriorate the commercial value of the raw sea urchin gonads. Thus it is said that the effective period of this treatment is limited to 4 or 5 days at the longest. In addition, alum shows a rough, bitter or astringent taste per se. Therefore, the use of a large amount of alum affects the taste of the raw sea urchin gonads. The inherent flavor and sweetness are lowered with the lapse of time, which makes the astringent or bitter taste of alum further conspicuous. Thus the taste of the raw sea urchin gonads is significantly deteriorated.

On the other hand, the partial-freezing method, which is a typical physical process, is advantageous in that a freshness of raw sea urchin gonads can be maintained in a partial-freezing state ($-1°$ to $3°$ C.) for a long time. However, an increase in temperature would cause meat-breakdown at an increasing rate. Furthermore, this process requires an elevated distribution cost, which is a disadvantage from an economical viewpoint.

DISCLOSURE OF THE INVENTION

Accordingly, it has been required to further improve these known processes for maintaining a freshness of raw sea urchin gonads in order to suppress meat-breakdown of raw sea urchin gonads and to satisfy the requirements in the production and distribution of raw sea urchin gonads.

As a result of extensive investigation to solve these problems, the present inventors have found out that the period of maintaining freshness and taste of raw sea urchin gonads can be remarkably improved by immersing raw sea urchin gonads taken out of tests in an aqueous solution containing a branched dextrin, thus completing the present invention.

When immersed in an aqueous solution, raw sea urchin gonads, which have a low osmotic pressure, would be liable to swell and thus cause meat-breakdown. Therefore, it is important to somewhat control the osmotic pressure with the use of an isotonic agent such as sodium chloride to thereby appropriately swell raw sea urchin gonads. Thus the appearance of the raw sea urchin gonads is improved, which elevates the commercial value thereof. It is another essential factor that the employed additive(s) would never affect the taste of raw sea urchin gonads. Each of the additives to be used in the present invention has no taste and no odor and is colorless. Thus it never affects the taste of raw sea urchin gonads. The concentration of the isotonic agent to be used in the present invention (for example, sodium chloride) in the aqueous solution preferably ranges from 2.2 to 3.3 % (w/v). A branched dextrin is first added to the aqueous solution of sodium chloride of a concentration within the above range. Next, raw sea urchin gonads are immersed in said solution for a definite period, usually several seconds to several minutes and preferably several tens seconds. Thus the raw sea urchin gonads can sustain the shape depending on the concentration and the meat-breakdown can be considerably suppressed. Furthermore, the disappearance of the inherent taste of the raw sea urchin gonads (i.e., flavor and sweetness) can be relieved. In this case, the concentration of the branched dextrin preferably ranges from 1.0 to 10 % (w/v), more preferably from 2.0 to 5.0 % (w/v).

A branched dextrin is obtained by hydrolyzing the straight chain moiety of starch with $\alpha$-amylase (a liquefying type enzyme) to thereby give a high molecular weight dextrin including many branched parts as an intermediate. Branched dextrins are classified into separated ones, which are obtained by digesting a common starch such as corn starch with an enzyme and removing low molecular weight oligosaccharides therefrom by continuous chromatography, and waxy ones, which are obtained by slightly digesting a waxy corn with an enzyme so as to avoid the formation of low molecular weight oligosaccharides. Either the former type or the latter one is available in the present invention, so long as it has a DE (Dextrose Equivalent) value of from 2 to 20, preferably from 4 to 16. The DE value means the content of directly reducing sugars calculated as glucose and expresses the ratio of saccharification. A lower DE value means a dextrin of the higher molecular weight or the more branched parts. To an aqueous solution containing sodium chloride and a branched dextrin, each at a concentration within the range as specified above, alginic acid or a salt thereof (preferably sodium alginate) is added. Then raw sea urchin gonads are immersed in the aqueous solution thus obtained for a definite period, usually several seconds to several minutes and preferably several tens seconds, similar to the above-mentioned case. Then the raw sea urchin gonads are further immersed in an aqueous solution containing 0.5 to 1.5 of an edible calcium salt (preferably a 2.2 to 3.3% (w/v) aqueous solution of sodium chloride) within one minute for usually several seconds to several minutes and preferably several tens seconds. Thus the raw sea urchin gonads are coated with the alginic acid or its salt and the calcium salt. In this case, the shape and taste of the raw sea urchin gonads are further effectively maintained. The alginic acid or its salt, which should be selected from among those specified as food additives, may be preferably used at a concentration of 0.1 to 0.5%, in the case of sodium alginate.

According to the above-mentioned procedure, various food additives such as antioxidant or preservative may be used together depending on the purpose, within the scope of the regulation on food additives.

BEST MODE FOR CARRYING OUT THE INVENTION

Example 1

Raw sea urchin gonads were taken out of the tests and immersed in a 3.3% aqueous solution of common salt. Next, the raw sea urchin gonads were divided into lots and respectively immersed in 2.8% aqueous solutions of common salt containing 0.0%, 3.0% and 5.0% of a branched dextrin (DE value: 16) for 10 seconds. After draining the solution, each sample was transported into a wooden box and stored at 5° C. while examining changes in shape and taste (flavor, sweetness) with the lapse of time. In the lot treated with common salt alone, both of the shape and taste were significantly deteriorated with the lapse of time. In contrast, the freshness was maintained in the branched dextrin-addition lots. In the lot treated with 5% of branched dextrin, in particular, the freshness immediately after the treatment was maintained at least for 8 days.

The results are shown in Table 1 below.

Example 2

Raw sea urchin gonads were taken out of the tests and immersed in a 3.3% aqueous solution of common salt. Next, the raw sea urchin gonads were divided into lots and respectively immersed in 2.8% aqueous solutions of common salt containing 0.0%, 3.0% and 5.0% of a branched dextrin (DE value: 16) and 0.0%, 0.1% and 0.3% of sodium alginate for 10 seconds. Samples in the lots treated with alginic acid were further immersed in an aqueous solution of common salt containing 1.0% of calcium chloride for 10 seconds. After draining the solution, each sample was transported into a wooden box and stored at 5° C., while examining changes in the shape and taste (flavor and sweetness) with the lapse of time. In the lots treated with sodium alginate alone, the freshness could not be maintained at each concentration. In the lots treated with solutions containing the branched dextrin and sodium alginate, both of the shape and taste of the raw sea urchin gonads could be more effectively maintained depending on the concentration of the sodium alginate, compared with the lots of Example 1 treated with the branched dextrin alone. When sodium alginate was used together with 3.0% or more of the branched dextrin, in particular, the freshness immediately after the treatment was maintained for at least 8 days. The results are shown in Table 2 below.

TABLE 1

| Branched Dextrin Concentration | Shape | | | | Taste (flavor, sweetness) | | | |
|---|---|---|---|---|---|---|---|---|
| (%) | 1* | 3* | 5* | 8* | 1* | 3* | 5* | 8* |
| 0.0 | 3 | 2 | 1 | 1 | A | B | C | D |
| 3.0 | 4 | 4 | 3 | 3 | A | A | A | A |
| 5.0 | 4 | 4 | 4 | 3 | A | A | A | A |

TABLE 2

Additive (in 2.8% common salt solution)

| Branched Dextrin Concentration (%) | Sodium Alginate (%) | Shape | | | | Taste (flavor, sweetens) | | | |
|---|---|---|---|---|---|---|---|---|---|
| | | 1* | 3* | 5* | 8* | 1* | 3* | 5* | 8* |
| 0.0 | 0.0 | 3 | 2 | 1 | 1 | A | B | C | D |
| | 0.1 | 3 | 2 | 1 | 1 | A | B | C | D |
| | 0.3 | 3 | 2 | 1 | 1 | A | B | C | D |
| 3.0 | 0.0 | 4 | 4 | 3 | 3 | A | A | A | B |
| | 0.1 | 4 | 4 | 3 | 3 | A | A | A | B |
| | 0.3 | 4 | 4 | 4 | 4 | A | A | A | A |
| 5.0 | 0.0 | 4 | 4 | 4 | 3 | A | A | A | A |
| | 0.1 | 4 | 4 | 4 | 4 | A | A | A | A |
| | 0.3 | 4 | 4 | 4 | 4 | A | A | A | A |

Note
*means preservation (day. 5° C.)

Criteria for evaluation in Tables 1 and 2:
4: Maintaining the shape immediately after the treatment.
3: Somewhat meat-breakdown.
2: Meat-breakdown.
1: Serious meat-breakdown.
(Items for evaluating meat-breakdown)
  1) Moist surface.→Oozing of the content. →Increase in the oozing content causes melting.
  2) When piled and preserved, raw sea urchin gonads in the lower layer suffered from accelerated meat-breakdown caused by the weight. The extent of meat-breakdown was examined.
  3) It was examined whether the inside of raw sea urchin gonads was softened or not by cutting.
  4) It was examined whether the raw sea urchin gonads could be hold up with chopsticks or tweezers or not without causing meat-breakdown.
(Item for evaluating the taste)
  A: Maintaining the taste immediately after the treatment.
  B: Somewhat deteriorated taste.
  C: Deteriorated taste.
  D: Seriously deteriorated taste.

The flavor of raw sea urchin gonads was deteriorated with the deterioration in the sweetness thereof.

INDUSTRIAL APPLICABILITY

According to the present invention, the shape and taste (flavor and sweetness) of sea urchin gonads can be extremely maintained, thus elongating a period of maintaining the freshness.

What is claimed is:

1. A process for maintaining the freshness of raw sea urchin gonads which comprises immersing the raw sea urchin gonads in an amount of an aqueous solution containing a branched dextrin which is sufficient to maintain the freshness of said raw sea urchin gonads.

2. A process for maintaining the freshness of raw sea urchin gonads which comprises immersing the raw sea urchin gonads in an amount of an aqueous solution containing (a) a branched dextrin and (b) alginic acid or a salt thereof which is sufficient to maintain the freshness of said raw sea urchin gonads.

3. A process for maintaining the freshness of raw sea urchin gonads which comprises immersing the raw sea urchin gonads in an amount of an aqueous solution containing (a) a branched dextrin and (b) alginic acid or a slat thereof which is sufficient to maintain the freshness of said raw sea urchin gonads and then immersing the raw sea urchin gonads in an amount of another aqueous solution containing an edible calcium salt which is effective to further maintain the shape and taste of said raw sea urchin gonads.

4. A process for producing raw sea urchin gonads whose freshness is maintained which comprises immersing the raw sea urchin gonads in an amount of an aqueous solution containing a branched dextrin which is sufficient to maintain the freshness of said raw sea urchin gonads.

* * * * *